UNITED STATES PATENT OFFICE.

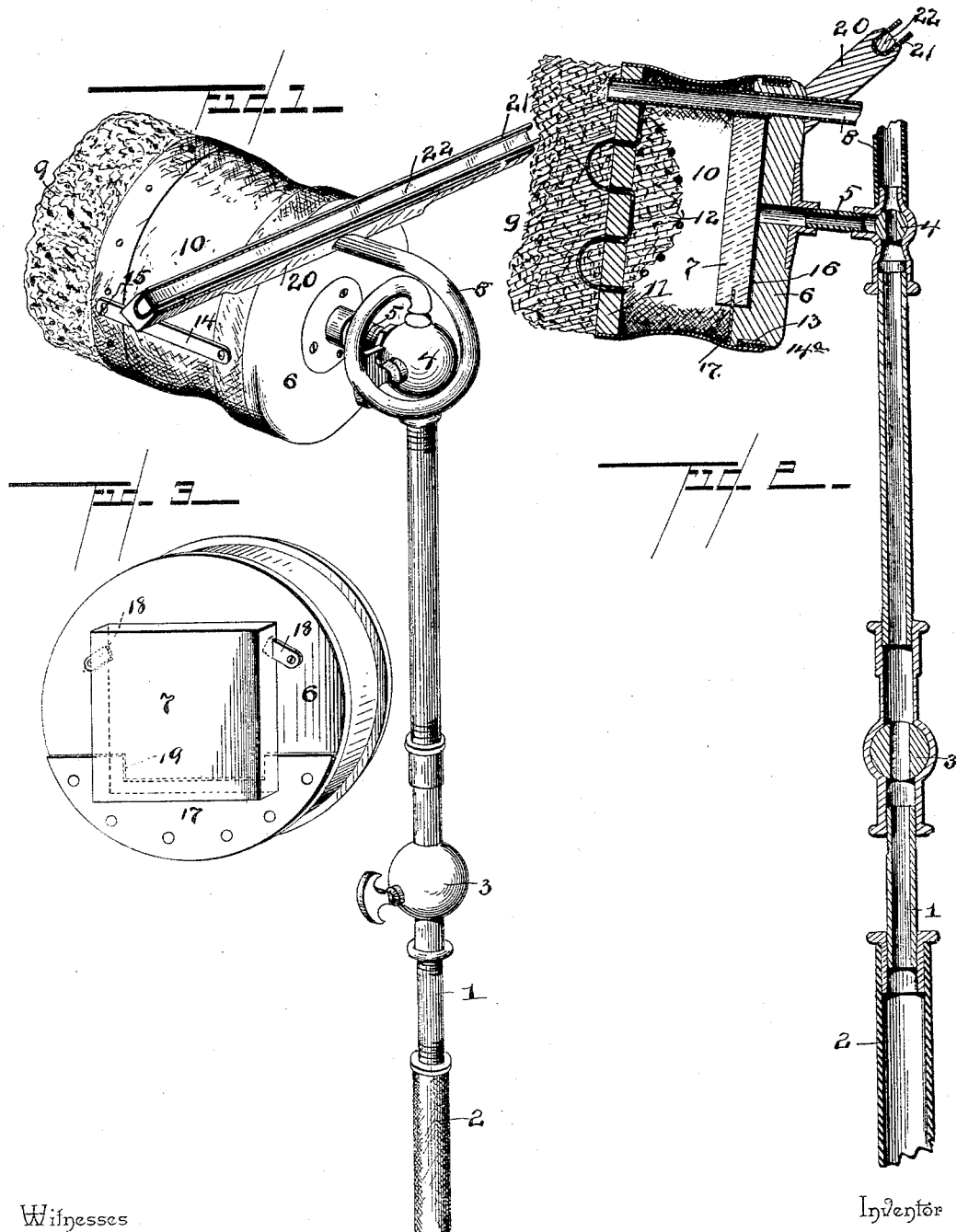

LOUIS SIN CLAIR, OF STANBERRY, MISSOURI.

BRUSH.

SPECIFICATION forming part of Letters Patent No. 467,778, dated January 26, 1892.

Application filed July 13, 1891. Serial No. 399,390. (Model.)

*To all whom it may concern:*

Be it known that I, LOUIS SIN CLAIR, a citizen of the United States, residing at Stanberry, in the county of Gentry and State of Missouri, have invented a new and useful Brush, of which the following is a specification.

This invention relates to improvements in washers for windows, carriages, and analogous purposes.

The object of the present invention is to provide a washer adapted for cleaning windows, vehicles, and the like and capable of supplying suds for cleaning and pure water after cleaning for the removal of the suds.

The invention consists in the construction and novel combination and arrangement of parts hereinafter fully described, illustrated in the accompanying drawings, and pointed out in the claims hereto appended.

In the drawings, Figure 1 is a perspective view of a washer constructed in accordance with this invention. Fig. 2 is a longitudinal sectional view. Fig. 3 is a detail perspective view of the disk, illustrating the means for securing a cake of soap.

Referring to the accompanying drawings, 1 designates a tubular handle adapted to be connected by a hose 2 with a hydrant or other suitable water-supply and having a cock 3, adapted to close the opening of the handle to shut off the supply of water. The handle is provided at one end with a suitable hose connection, by which it is attached to the hose 2, and has at the other end a two-way cock 4, adapted to direct water through a short tube 5 to a disk 6, and thence to a cake of soap 7, or through a tube 8 when it is desired to supply clear water. A sponge 9 is connected with the disk 6 by a hood 10, constructed of suitable flexible water-proof material and being detachably connected to the disk 6, whereby it may be readily removed to supply a cake of soap 7 when desired. The sponge 9 is secured to a perforated plate 11, which permits the passage of water or suds to the sponge and which is provided on its inner face with a sponge 12, adapted, when the device is in use, to rub the surface of the soap and produce suds. The hood 10 is attached to the disk, which is provided with an annular groove 13, by means of a strap 14ª, and it is tacked or otherwise secured to the periphery of the perforated plate 11. The parts are braced by bars 14, which are hinged to the periphery of the disk and are provided in their free ends with recesses and are adapted to engage projections 15 of the plate 11.

The disk 6 is provided in its inner face with a rectangular soap-recess 16, with which the short tube 5 communicates and which is adapted to receive a cake of soap and is provided at one end with a stationary segmental plate 17, adapted to engage an end of the soap, and at opposite sides with pivoted plates 18, adapted to be turned inward to engage the sides of the soap, and the plate 17 is provided in its straight edge with a recess 19, whereby it is adapted to engage both an end and sides of a cake of soap.

When a cake of soap has been used, the hood may be readily removed to permit another cake to be secured in the soap-recess of the disk. During the operation when water is passing through the short tube 5 into the soap-recess the perforated plate 11, which has an oscillating motion, causes the small sponge 12 to rub over the face of a cake of soap to produce lather and suds, and the latter passes through the perforations of the plate to the sponge and is distributed over the surface to be cleaned. After a surface has been thoroughly cleaned with suds and it is desired to remove the latter the two-way cock is turned to close the short tube and to cause water to pass through the flexible tube 8, which passes around the cake of soap through openings in the disk and the perforated plate and discharges water directly to the sponge.

A drier is secured to the disk, and consists of a bar 20, provided with a longitudinal groove and having a strip of rubber 21 secured in the groove by a strip 22 and projecting beyond the bar.

What I claim is—

1. A washer comprising the tubular handle adapted to be connected to a water-supply, a disk secured to the handle and provided with means for securing a cake of soap, and a sponge flexibly connected with the disk and having an oscillating motion and adapted to move over the face of a cake of soap during the operation of the washer, substantially as described.

2. A washer comprising a tubular handle adapted to be connected with a water-supply, a disk secured to the handle, a perforated plate, a hood connecting the disk and the plate, and sponges secured to the faces of the plate, substantially as described.

3. A washer comprising the tubular handle adapted to be connected with a water-supply, a disk secured to the handle and provided with a soap-recess, suitable means for securing a cake of soap in the recess, a perforated plate, a hood connecting the perforated plate with the disk, and sponges secured to the faces of the plate, substantially as described.

4. A washer comprising a tubular handle, a disk secured to the handle and provided with means for securing a cake of soap, a perforated plate, a hood flexibly connecting the plate and the disk and being detachably secured to the latter, sponges secured to the faces of the plate, and bars hinged to the disk and engaging the plate and permitting an oscillation of the latter, substantially as described.

5. In a washer, the combination of the disk provided with a soap-recess designed to communicate with a suitable water-supply and adapted to receive a cake of soap, a stationary plate secured to the disk and adapted to engage an end of a cake of soap, and a pivoted plate secured at the sides of the recess and adapted to engage the sides of the cake, substantially as described.

6. In a washer, the combination of the disk provided with a soap-recess adapted to receive a cake of soap and designed to communicate with a suitable water-supply, a stationary plate secured to the disk and arranged at one end of the recess and provided with a rectangular recess adapted to engage an end and sides of a cake of soap, and the pivoted plates arranged at the sides of the soap-recess and adapted to engage the sides of the cake, substantially as described.

7. In a washer, the combination of the disk having an annular groove in its periphery and provided with a soap-recess designed to communicate with a suitable water-supply, suitable means for securing a cake of soap, a perforated plate, sponges secured to the faces of the plate, and a hood attached to the plate and provided with a drawing-strap adapted to engage the groove of the disk, substantially as described.

8. In a washer, the combination of the disk provided with suitable means for securing a cake of soap, a perforated plate, sponges arranged on opposite faces of the plate, a hood connecting the plate and the disk, a tubular handle designed to be connected with a suitable water-supply and provided with a tube 5, communicating with the disk, a tube 8, connecting the handle with the sponge on the outer face of the plate, and a two-way cock adapted to direct water through the tube 5 or the tube 8, substantially as described.

In testimony that I claim the foregoing as my own I have hereto affixed my signature in presence of two witnesses.

LOUIS SIN CLAIR.

Witnesses:
A. C. FRISBIE,
S. J. FREEMAN.